US012266287B2

(12) United States Patent
Wang et al.

(10) Patent No.: US 12,266,287 B2
(45) Date of Patent: Apr. 1, 2025

(54) GAMMA DEBUGGING METHOD, APPARATUS AND DEVICE

(71) Applicant: KunShan Go Visionox Opto Electronics Co., Ltd, Jiangsu (CN)

(72) Inventors: Yuqing Wang, Kunshan (CN); Tao Tang, Kunshan (CN); Zheng Wang, Kunshan (CN)

(73) Assignee: KunShan Go Visionox Opto Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/340,065

(22) Filed: Jun. 23, 2023

(65) Prior Publication Data

US 2023/0335033 A1 Oct. 19, 2023

Related U.S. Application Data

(63) Continuation of application No. PCT/CN2021/135501, filed on Dec. 3, 2021.

(30) Foreign Application Priority Data

May 28, 2021 (CN) ......................... 202110595301.3

(51) Int. Cl.
*G09G 3/20* (2006.01)

(52) U.S. Cl.
CPC ......... *G09G 3/2007* (2013.01); *G09G 3/2096* (2013.01); *G09G 2320/0626* (2013.01); (Continued)

(58) Field of Classification Search
None
See application file for complete search history.

(56) References Cited

U.S. PATENT DOCUMENTS

2016/0196793 A1* 7/2016 Xu ....................... G09G 3/3611 345/694
2019/0051235 A1* 2/2019 Zhang ...................... H04N 9/69
(Continued)

FOREIGN PATENT DOCUMENTS

CN 105590587 A 5/2016
CN 105741775 A 7/2016
(Continued)

OTHER PUBLICATIONS

Office Action issued on Feb. 11, 2022, in corresponding Chinese Application No. 202110595301.3, 13 pages.
(Continued)

*Primary Examiner* — Benjamin C Lee
*Assistant Examiner* — Emily J Frank
(74) *Attorney, Agent, or Firm* — Maier & Maier, PLLC

(57) ABSTRACT

A Gamma debugging method, apparatus and device. The method includes: determining a target display parameter of a display module at an $i^{th}$ gray scale binding point according to a target display parameter of the display module at a first gray scale binding point and a preset Gamma mapping relationship, controlling the display module to display an initial gray scale picture according to the target display parameter at the $i^{th}$ gray scale binding point, and collecting an actual display parameter of the display module at the $i^{th}$ gray scale binding point; and adjusting, under a condition that a difference between the actual display parameter at the $i^{th}$ gray scale binding point and the target display parameter at the $i^{th}$ gray scale binding point goes beyond a preset deviation threshold range, a data signal parameter corresponding to the $i^{th}$ gray scale binding point.

14 Claims, 6 Drawing Sheets

(52) U.S. Cl.
CPC ............... *G09G 2320/0666* (2013.01); *G09G 2320/0673* (2013.01); *G09G 2320/0693* (2013.01); *G09G 2360/16* (2013.01)

(56) References Cited

U.S. PATENT DOCUMENTS

| | | | | |
|---|---|---|---|---|
| 2020/0286423 | A1* | 9/2020 | Yu | G09G 3/3208 |
| 2022/0335876 | A1* | 10/2022 | Chen | G09G 3/20 |
| 2023/0196995 | A1* | 6/2023 | Li | G09G 3/3208 345/204 |
| 2024/0013696 | A1* | 1/2024 | Chang | G09G 3/2007 |
| 2024/0112616 | A1* | 4/2024 | Han | G09G 3/3225 |

FOREIGN PATENT DOCUMENTS

| | | | | | |
|---|---|---|---|---|---|
| CN | 108711397 | A | | 10/2018 | |
| CN | 109147689 | A | | 1/2019 | |
| CN | 110491330 | A | | 11/2019 | |
| CN | 110675823 | A | | 1/2020 | |
| CN | 111210756 | A | | 5/2020 | |
| CN | 111223437 | A | | 6/2020 | |
| CN | 111554218 | A | | 8/2020 | |
| CN | 111968594 | A | | 11/2020 | |
| CN | 112365839 | A | | 2/2021 | |
| CN | 112530288 | A | | 3/2021 | |
| CN | 112562585 | A | | 3/2021 | |
| CN | 112992059 | A | * | 6/2021 | G09G 3/3208 |
| CN | 113299216 | A | | 8/2021 | |
| JP | 2007225694 | A | | 9/2007 | |
| TW | I557721 | B | | 11/2016 | |

OTHER PUBLICATIONS

Office Action issued on Aug. 29, 2022, in corresponding Chinese Application No. 202110595301.3, 10 pages.
International Search Report issued on Feb. 21, 2022 in corresponding International Application No. PCT/CN2021/135501, 7 pages.

* cited by examiner

GAMMA DEBUGGING METHOD, APPARATUS AND DEVICE

CROSS-REFERENCE TO RELATED APPLICATIONS

The present application is a continuation of International Application No. PCT/CN2021/135501 filed on Dec. 3, 2021, which claims the benefit of priority to Chinese Patent Application No. 202110595301.3 filed on May 28, 2021, and entitled "GAMMA DEBUGGING METHOD, APPARATUS, DEVICE AND STORAGE MEDIUM", both of which are incorporated herein by reference in their entireties.

TECHNICAL FIELD

The present application relates to the field of display technology, and particularly, to a Gamma debugging method, apparatus and device.

BACKGROUND

With development of display technology, a display module can support a variety of screen refresh rates such as 60 Hz, 90 Hz, 120 Hz and 144 Hz. In order to ensure display effects of the display module under each of the screen refresh rates, Gamma debugging is required for the display module before the display module leaves the factory.

However, since the Gamma debugging is required under each of the refresh rates supported by the display module, the Gamma debugging on the display module take an increased time, thereby resulting a reduced efficiency of the Gamma debugging.

SUMMARY

Embodiments of the present application provide a Gamma debugging method, apparatus and device, which can improve the efficiency of the Gamma debugging.

In a first aspect, the embodiments of the present application provide a Gamma debugging method, including: determining a target display parameter of a display module under test at an $i^{th}$ gray scale binding point among a plurality of gray scale binding points according to a target display parameter of the display module at a first gray scale binding point among the gray scale binding points and a preset Gamma mapping relationship, wherein the i is an integer greater than 1, and the Gamma mapping relationship includes a mapping relationship between gray scales and target display parameters; controlling the display module to display an initial gray scale picture according to the target display parameter at the $i^{th}$ gray scale binding point, and collecting an actual display parameter of the display module at the $i^{th}$ gray scale binding point, wherein a gray scale of the initial gray scale picture is the same as a gray scale corresponding to the first gray scale binding point; and adjusting, under a condition that a difference between the actual display parameter at the $i^{th}$ gray scale binding point and the target display parameter at the $i^{th}$ gray scale binding point goes beyond a preset deviation threshold range, a data signal parameter corresponding to the $i^{th}$ gray scale binding point such that the difference between the actual display parameter at the $i^{th}$ gray scale binding point and the target display parameter at the $i^{th}$ gray scale binding point is within the preset deviation threshold range, wherein the data signal parameter is configured to control a voltage of a data signal.

In a second aspect, the embodiments of the present application provide a Gamma debugging apparatus, including: a calculation module configured to determine a target display parameter of a display module under test at an $i^{th}$ gray scale binding point among a plurality of gray scale binding points according to a target display parameter of the display module at a first gray scale binding point among the gray scale binding points and a preset Gamma mapping relationship, wherein the i is an integer greater than 1, and the Gamma mapping relationship includes a mapping relationship between gray scales and target display parameters; a control module configured to control the display module to display an initial gray scale picture according to the target display parameter at the $i^{th}$ gray scale binding point, wherein a gray scale of the initial gray scale picture is the same as a gray scale corresponding to the first gray scale binding point; a collecting module configured to collect an actual display parameter of the display module at the $i^{th}$ gray scale binding point when the display module is displaying the initial gray scale picture according to the target display parameter at the $i^{th}$ gray scale binding point; and an adjustment module configured to adjust, under a condition that a difference between the actual display parameter at the $i^{th}$ gray scale binding point and the target display parameter at the $i^{th}$ gray scale binding point goes beyond a preset deviation threshold range, a data signal parameter corresponding to the $i^{th}$ gray scale binding point such that the difference between the actual display parameter at the $i^{th}$ gray scale binding point and the target display parameter at the $i^{th}$ gray scale binding point is within the preset deviation threshold range, wherein the data signal parameter is configured to control a voltage of a data signal.

In a third aspect, the embodiments of the present application provide a Gamma debugging device, including: a processor and a memory storing computer program instructions, wherein the processor executes the computer program instructions to implement the Gamma debugging method according to the first aspect.

DETAILED DESCRIPTION

With development of display technology, a display module may support more and more screen refresh rates such as 60 Hz, 90 Hz, 120 Hz, 144 Hz, and the like. In order to ensure display effects of the display module under each of the screen refresh rates, Gamma debugging is required for the display module before the display module leaves the factory. The Gamma debugging is required to be performed under each of the screen refresh rate, so the Gamma debugging takes an increased time, thereby resulting a reduced efficiency of the Gamma debugging. Since the Gamma debugging takes an increased time, it results an increased production takt time for the display module. For example, a display module supporting two screen refresh rates may have a production takt time of 260 seconds, and a display module supporting four screen refresh rates may have a production takt time of at least 520 seconds.

The present application provides a Gamma debugging method, apparatus, device and storage medium, which can shorten the time taken by the Gamma debugging for the screen refresh rates supported by the display module to improve the efficiency of the Gamma debugging, thereby shortening the production takt time for the display module.

Figure 1:
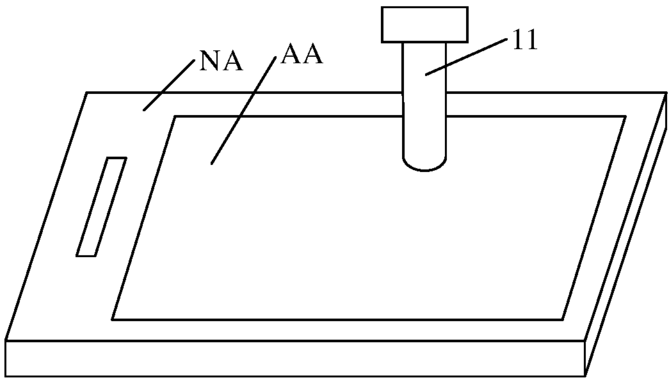
FIG. 1 is a schematic view of an exemplary application scenario of a Gamma debugging method according to an embodiment of the present application.

In the embodiments of the present application, a display parameter of a display module under test is collected by an optical collection device, and used for implementing the Gamma debugging in combination with a preset target display parameter. As shown in FIG. 1, the display module has a display region AA and a non-display region NA, and a probe 11 of the optical collection device is placed on the display region AA to collect the display parameter of the display module when displaying an image.

Figure 2:
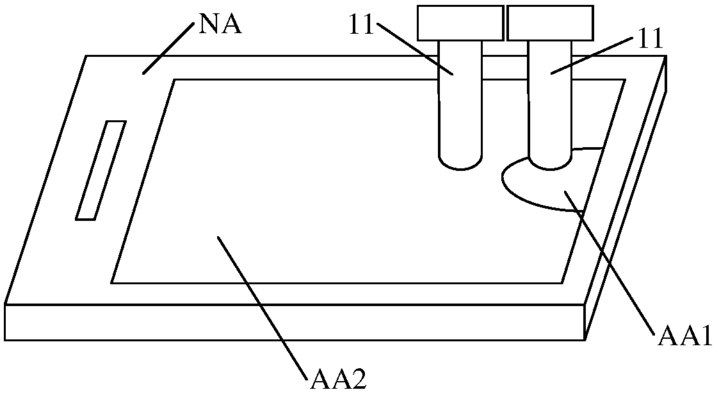
FIG. 2 is a schematic view of another exemplary application scenario of a Gamma debugging method according to an embodiment of the present application.

The optical collection device may have one or more probes, which is not limited herein. For example, the optical collection device has only one probe. As shown in FIG. 1, the probe 11 is used for collecting the display parameter of the display module. As another example, the optical collection device may have two probes. As shown in FIG. 2, the display module has a display region AA and a non-display region NA, and the display region AA includes a first display region AA1 and a second display region AA2. A light transmittance of the first display region AA1 is greater than a light transmittance of the second display region AA2. A photosensitive component required for the display module may be specifically arranged on backside of the first display region AA1. The photosensitive component may be a front camera, an infrared light sensor, a proximity light sensor, and the like. As shown in FIG. 2, one of the two probes 11 is placed on the first display region AA1 to collect a display parameter of the first display region AA1; and the other of the two probes 11 is placed on the second display region AA2 to collect a display parameter of the second display region AA2.

Figure 3:
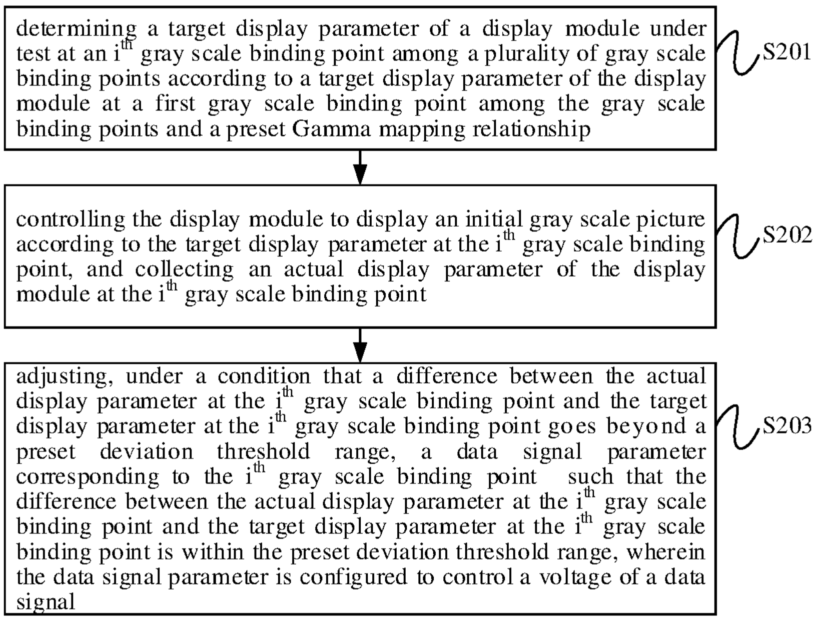
FIG. 3 is a flowchart of an example of a Gamma debugging method according to an embodiment of the present application.

The present application provides a Gamma debugging method executable by a Gamma debugging apparatus. As shown in FIG. 3, the Gamma debugging method include steps from S201 to S203.

In step S201, a target display parameter of a display module under test at an $i^{th}$ gray scale binding point among a plurality of gray scale binding points is determined according to a target display parameter of the display module at a first gray scale binding point and a preset Gamma mapping relationship.

The i is an integer greater than 1. The gray scale binding points are gray scale debugging points selected in a process of the Gamma debugging, and one of the gray scale binding points corresponds to one gray scale. The number of the gray scale binding points is not limited herein. For example, from 256 gray scales from 0 to 255, 20 to 40 gray scales may be selected at intervals as the gray scale binding points for performing the Gamma debugging to obtain debugged data signal parameters at the gray scale binding points. Based on the debugged data signal parameters at the gray scale binding points, data signal parameters at gray scales other than the gray scale binding points may be determined by a method of interpolation or other methods, which is not limited herein.

The target display parameter is a desired display parameter. A target display parameter at a gray scale binding point is a display parameter expected to be reached for a gray scale corresponding to the gray scale binding point. A display parameter is a parameter capable of characterizing a display effect. For example, the display parameter may include brightness. Accordingly, the target display parameter may include target brightness. As another example, the display parameter may include both a color coordinate and brightness. The target display parameter may include both target brightness and a target color coordinate accordingly.

The preset Gamma mapping relationship may include a mapping relationship between gray scales and target display parameters. After a target display parameter at a gray scale binding point is obtained, a target display parameter at another gray scale binding point may be determined according to the target display parameter at the gray scale binding point and the Gamma mapping relationship.

It is assumed that there are N gray scale binding points in total, which are form a first gray scale binding point to an $N^{th}$ gray scale binding point. The $i^{th}$ gray scale binding point is any one of gray scale binding points from a second gray scale binding point to the $N^{th}$ gray scale binding point. The first gray scale binding point may be a gray scale binding point with a highest gray scale, for example, the gray scale of 255.

In some examples, target display parameters at the second gray scale binding point to the $N^{th}$ gray scale binding point may be determined, respectively, according to the target display parameter of the first gray scale binding point.

In other examples, a target display parameter at the second gray scale binding point is determined according to the target display parameter at the first gray scale binding point; a target display parameter at a third gray scale binding point is determined according to the target display parameter at the second gray scale binding point, and so on, until a target display parameter at the $N^{th}$ gray scale binding point is determined according to a target display parameter at an $(N-1)^{th}$ gray scale binding point. That is, the target display parameter at the $i^{th}$ gray scale binding point may be determined according to a target display parameter at an $(i-1)^{th}$ gray scale binding point.

In step S202, the display module is controlled to display an initial gray scale picture according to the target display parameter at the $i^{th}$ gray scale binding point, and an actual display parameter of the display module at the $i^{th}$ gray scale binding point is collected.

The display module may display an initial gray scale picture in a continuous way. That is, in a process of performing the Gamma debugging for any of the gray scale binding points, the display module always displays the initial gray scale picture. The gray scale of the initial gray scale picture is consistent with a gray scale corresponding to the first gray scale binding point. In a process of testing different gray scale binding points, the target display parameters for the initial gray scale picture displayed by the display module are different. For example, a target brightness of the initial gray scale picture displayed in a process of performing the Gamma debugging for the second gray scale binding point is L1, and a target brightness of the initial gray scale picture displayed in a process of performing the Gamma debugging for the third gray scale binding point is L2, where L1 is different from L2.

Although the display module is controlled to display the initial gray scale picture according to the target display parameter, an actual display parameter of the initial gray scale picture displayed by the display module may have a relatively large deviation from the target display parameter, and therefore the Gamma debugging is required to be performed.

The actual display parameter is a display parameter actually shown by the display module when the display module displays the initial gray scale picture according to the target display parameter. For example, the display parameter may include brightness, and correspondingly, the actual display parameter includes actual brightness. As another example, the display parameter include both brightness and a color coordinate, and correspondingly, the actual display parameter includes both actual brightness and an actual color coordinate.

In some examples, the actual display parameter of the display module at the $i^{th}$ gray scale binding point may be collected by an optical collection device.

In step S203, a data signal parameter corresponding to the $i^{th}$ gray scale binding point is adjusted under a condition that a difference between the actual display parameter at the $i^{th}$ gray scale binding point and the target display parameter at the $i^{th}$ gray scale binding point goes beyond a preset deviation threshold range, such that the difference between the actual display parameter at the $i^{th}$ gray scale binding point and the target display parameter at the $i^{th}$ gray scale binding point is within the preset deviation threshold range.

The preset deviation threshold range is an acceptable deviation range between the actual display parameter and the target display parameter, which may be set according to scenarios and requirements and is not limited herein. If the difference between the actual display parameter at the $i^{th}$ gray scale binding point and the target display parameter at the $i^{th}$ gray scale binding point goes beyond the preset deviation threshold range, it indicates that a voltage of a data signal corresponding to the $i^{th}$ gray scale binding point is required to be adjusted. If the difference between the actual display parameter at the $i^{th}$ gray scale binding point and the target display parameter at the $i^{th}$ gray scale binding point is within the preset deviation threshold range, it indicates that the voltage of the data signal corresponding to the $i^{th}$ gray scale binding point is suitable and is not required to be adjusted.

Specifically, the adjustment of the voltage of the data signal corresponding to the $i^{th}$ gray scale binding point may be implemented by adjusting the data signal parameter for controlling the voltage of the data signal. In some examples, the data signal parameter may include a voltage value of the data signal. In other examples, the data signal parameter may include a Gamma register value associated with the voltage of the data signal. The Gamma register value includes sub-pixel register values of a pixel unit in the display module. For example, the Gamma register value may include a red sub-pixel R register value, a green sub pixel G register value and a blue sub pixel B register value of the pixel unit, which is not limited herein.

The adjustment of the data signal parameter corresponding to the $i^{th}$ gray scale binding point may be performed multiple times until the difference between the actual display parameter at the $i^{th}$ gray scale binding point and the target display parameter at the $i^{th}$ gray scale binding point is within the preset deviation threshold range. It is noted that, in the embodiments, the Gamma debugging for each of the gray scale binding points may be performed in a same way as that for the $i^{th}$ gray scale binding point.

Under a condition that the display module supports multiple screen refresh rates, the Gamma debugging method according to the embodiment of the present application may be performed for each of the screen refresh rates supported by the display module.

In the embodiments of the present application, the display module is controlled to display, according to a target display parameter at a certain gray scale binding point, a gray scale picture having a gray scale consistent with a gray scale of the first gray scale binding point. By comparing the collected actual display parameter with the target display parameter, the data signal parameter for controlling the voltage of the data signal is adjusted such that an actual display parameter at the certain gray scale binding point is approximate to the target display parameter, that is, a difference between the actual display parameter and the target display parameter is within the preset deviation threshold range, thereby implementing the Gamma debugging. In a process of the Gamma debugging, for each of the gray scale binding points, a same gray scale picture with the gray scale is used, so it is not required to input and switch gray scale pictures with different gray scales, and thus time required for inputting and switching the gray scale pictures is saved, and time required for the Gamma debugging is shortened, thereby improving the efficiency of the Gamma debugging. Accordingly, the production takt time for the display module is also shortened. The production takt time for the display module may be halved by using the Gamma debugging scheme in the embodiments of the present application. Especially, under a condition that the display module supports multiple screen refresh rates, the time required for performing the Gamma debugging for the multiple screen refresh rates is significantly shortened.

Figure 4:
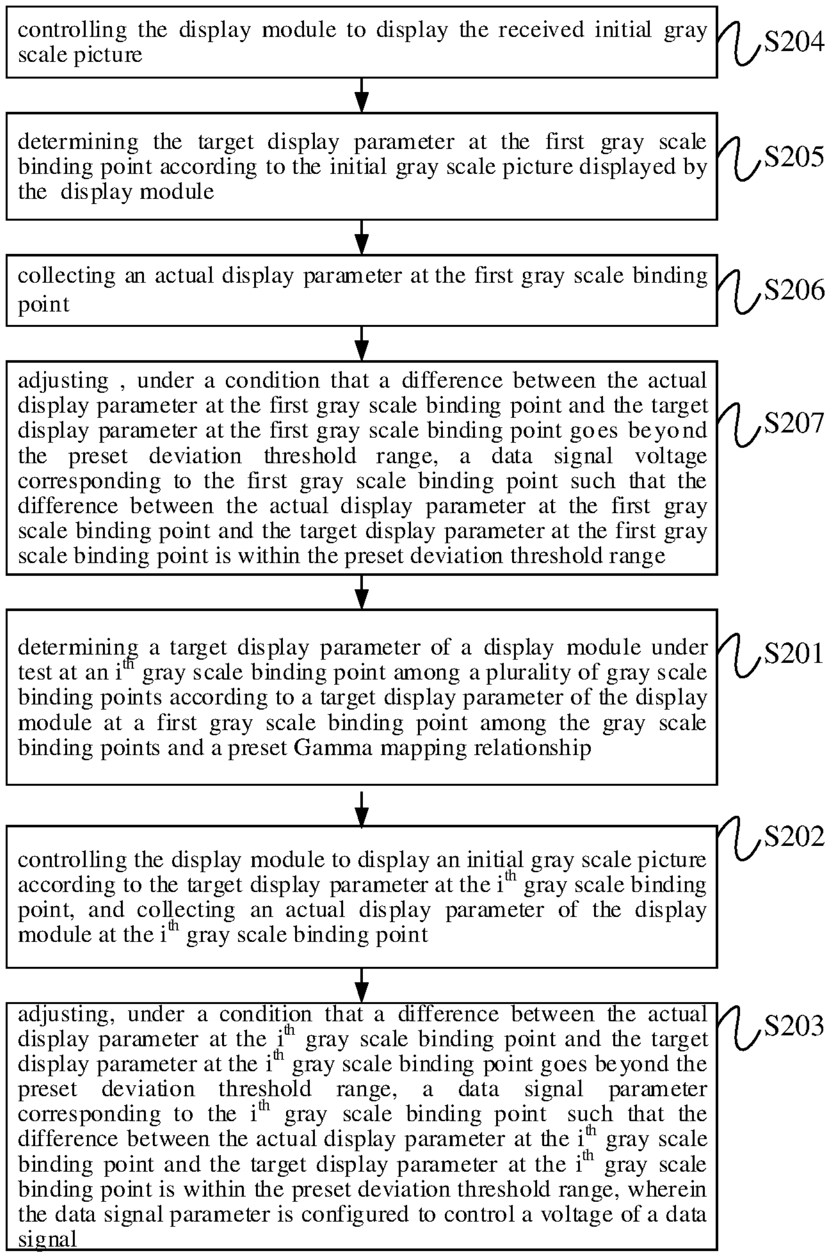
FIG. 4 is a flowchart of another example of a Gamma debugging method according to an embodiment of the present application.

In a process of performing the Gamma debugging for the first gray scale binding point, the gray scale picture is required to be inputted. FIG. 4 is a flowchart of another example of a Gamma debugging method according to an embodiment of the present application. FIG. 4 differs from FIG. 3 in that the Gamma debugging method shown in FIG. 4 further include steps from S204 to S207.

In step S204, the display module is controlled to display the received initial gray scale picture.

In the process of performing the Gamma debugging for the first gray scale binding point, an initial gray scale picture is required to be inputted to the display module so that the display module can display the initial gray scale picture.

In step S205, the target display parameter of the first gray scale binding point is determined according to the initial gray scale picture displayed by the display module.

The initial gray scale picture has a gray scale which is consistent with the gray scale corresponding to the first gray scale binding point. A target display parameter determined for the initial gray scale picture may be taken as the target display parameter at the first gray scale binding point.

In step S206, an actual display parameter at the first gray scale binding point is collected.

In step S207, a data signal voltage corresponding to the first gray scale binding point is adjusted under a condition that a difference between the actual display parameter at the first gray scale binding point and the target display parameter at the first gray scale binding point goes beyond the preset deviation threshold range, such that the difference between the actual display parameter at the first gray scale binding point and the target display parameter at the first gray scale binding point is within the preset deviation threshold range.

In some examples, after the data signal parameter is adjusted, the data signal parameter may be burned into the display module so that the display module can perform display according to the accurate data signal parameter for different gray scales.

In other examples, a target mapping relationship between target display parameters and data signal parameters may be established and burned into the display module, so that the display module can read out the target mapping relationship between target display parameters and data signal parameters determined by using other methods, which is not limited herein. The target display parameter may include a display parameter that can be reached by the display module. For example, under a condition that the display parameter is brightness, the target brightness may include a general target brightness and an actuated maximum target brightness, which is not limited herein.

In some examples, a target mapping relationship between target display parameters and data signal parameters may be established for the display module for each of the screen refresh rates. Each of the screen refresh rates corresponds to one target mapping relationship. The target mapping relationships between target display parameters and data signal parameters for the respective screen refresh rates may be burned into the display module.

For example, Table 1 below shows a mapping relationship between multiple target brightness and data signal parameters for the display module under four screen refresh rates.

TABLE 1

Figure 5:
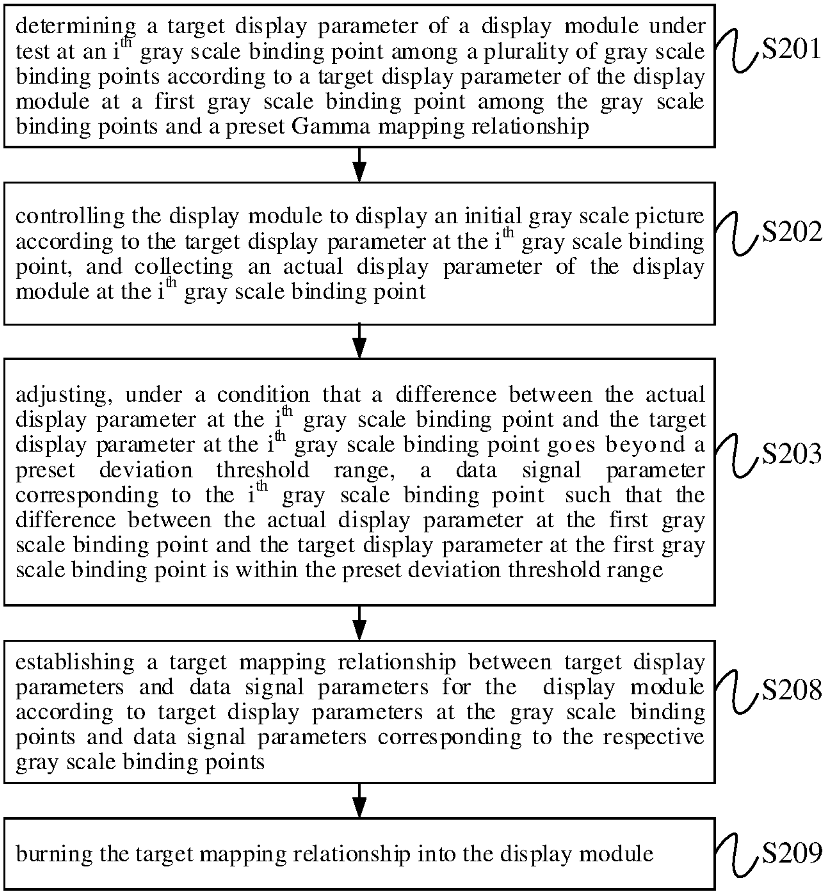
FIG. 5 is a flowchart of another example of a Gamma debugging method according to an embodiment of the present application.

| Target brightness | 2.2 | 5.9 | 10.1 | 20.0 | 50.1 | 120.0 | 300.1 | 450.0 | 700 |
|---|---|---|---|---|---|---|---|---|---|
| 60 Hz | Gamma 02 | Gamma 03 | Gamma 04 | Gamma 05 | Gamma 06 | Gamma 07 | Gamma 08 | Gamma 09 | Gamma 10 |
| 90 Hz | Gamma 12 | Gamma 13 | Gamma 14 | Gamma 15 | Gamma 16 | Gamma 17 | Gamma 18 | Gamma 19 | Gamma 20 |
| 120 Hz | Gamma 22 | Gamma 23 | Gamma 24 | Gamma 25 | Gamma 26 | Gamma 27 | Gamma 28 | Gamma 29 | Gamma 30 |
| 144 Hz | Gamma 32 | Gamma 33 | Gamma 34 | Gamma 35 | Gamma 36 | Gamma 37 | Gamma 38 | Gamma 39 | Gamma 40 |

to perform display according to the accurate data signal parameters for different gray scales. FIG. 5 is a flowchart of another example of a Gamma debugging method according to an embodiment of the present application. FIG. 5 differs from FIG. 3 in that the Gamma debugging method shown in FIG. 5 further include steps S208 and S209.

In step S208, the target mapping relationship between target display parameters and data signal parameters is established for the display module according to the target display parameters at the gray scale binding points and the data signal parameters corresponding to the respective gray scale binding points.

The data signal parameter corresponding to each of the gray scale binding point includes a data signal parameter that makes the difference between the actual display parameter and the target display parameter fall within the preset deviation threshold range. The target mapping relationship includes a mapping relationship between the target display parameters and the data signal parameters determined by the Gamma debugging method in the embodiments. The target mapping relationship may include a mapping relationship As shown in Table 1, Gamma02, Gamma03 . . . Gamma40 are specific data signal parameters. In a process of establishing the mapping relationship, values of the data signal parameters (from Gamma02 to Gamma10) of the display module under 60 Hz may be copied into the data signal parameters (from Gamma12 to Gamma20) of the display module under 90 Hz; values of the data signal parameters (from Gamma22 to Gamma30) of the display module under 120 Hz may be copied into the data signal parameters (from Gamma32 to Gamma40) of the display module under 144 Hz. The copying processes takes certain time.

In some cases, the display module may have a first display region and a second display region. Since the first display region and the second display region may have different structures, the target mapping relationship may be established for each of the first display region and the second display region.

For example, Table 2 below shows mapping relationships between target brightness and data signal parameters of the first display region AA1 and the second display region AA2 of the display module under four screen refresh rates.

TABLE 2

| Target brightness | 2.2 | 5.9 | 10.1 | 20.0 | 50.1 | 120.0 | 300.1 | 450.0 | 700 |
|---|---|---|---|---|---|---|---|---|---|
| AA1: 60 Hz | Gamma 02 | Gamma 03 | Gamma 04 | Gamma 05 | Gamma 06 | Gamma 07 | Gamma 08 | Gamma 09 | Gamma 10 |
| AA1: 90 Hz | Gamma 12 | Gamma 13 | Gamma 14 | Gamma 15 | Gamma 16 | Gamma 17 | Gamma 18 | Gamma 19 | Gamma 20 |
| AA1: 120 Hz | Gamma 22 | Gamma 23 | Gamma 24 | Gamma 25 | Gamma 26 | Gamma 27 | Gamma 28 | Gamma 29 | Gamma 30 |

TABLE 2-continued

| Target brightness | 2.2 | 5.9 | 10.1 | 20.0 | 50.1 | 120.0 | 300.1 | 450.0 | 700 |
|---|---|---|---|---|---|---|---|---|---|
| AA1: 144 Hz | Gamma 32 | Gamma 33 | Gamma 34 | Gamma 35 | Gamma 36 | Gamma 37 | Gamma 38 | Gamma 39 | Gamma 40 |
| AA2: 60 Hz | Gamma 42 | Gamma 43 | Gamma 44 | Gamma 45 | Gamma 46 | Gamma 47 | Gamma 48 | Gamma 49 | Gamma 50 |
| AA2: 90 Hz | Gamma 52 | Gamma 53 | Gamma 54 | Gamma 55 | Gamma 56 | Gamma 57 | Gamma 58 | Gamma 59 | Gamma 60 |
| AA2: 120 Hz | Gamma 62 | Gamma 63 | Gamma 64 | Gamma 65 | Gamma 66 | Gamma 67 | Gamma 68 | Gamma 69 | Gamma 70 |
| AA2: 144 Hz | Gamma 72 | Gamma 73 | Gamma 74 | Gamma 75 | Gamma 76 | Gamma 77 | Gamma 78 | Gamma 79 | Gamma 80 |

As shown in Table 2, Gamma02, Gamma03 . . . Gamma80 are specific data signal parameters. In a process of establishing the mapping relationships, values of the data signal parameters (form Gamma02 to Gamma10) of the first display region AA1 under 60 Hz may be copied into the data signal parameters (from Gamma12 to Gamma20) of the first display region AA1 under 90 Hz; values of the data signal parameters (from Gamma22 to Gamma30) of the first display region AA1 under 120 Hz may be copied into the data signal parameters (from Gamma32 to Gamma40) of the first display region AA1 under 144 Hz; values of the data signal parameters (from Gamma42 to Gamma50) of the second display region AA2 under 60 Hz may be copied into the data signal parameters (from Gamma52 to Gamma60) of the second display region AA2 under 90 Hz; and values of the data signal parameters (from Gamma62 to Gamma70) of the second display region AA2 under 120 Hz may be copied to the data signal parameters (from Gamma72 to Gamma80) of the second display region AA2 under 144 Hz. The copying processes takes certain time.

In some other examples, two screen refresh rates with approximate values of the display module may share a same target mapping relationship between target display parameters and data signal parameters. That is, the two screen refresh rates with approximate values correspond to a same target mapping relationship. The target mapping relationship for the two screen refresh rates may be burned into the display module.

Specifically, screen refresh rates supported by the display module may include a first refresh rate and a second refresh rate. The first refresh rate is less than the second refresh rate. The first refresh rate and the second refresh rate herein are presented for the two refresh rates, and do not mean that the display module supports only the two refresh rates. For example, the display module may supports four screen refresh rates, which are 60 Hz, 90 Hz, 120 Hz and 144 Hz, respectively. Among the 60 Hz and 90 Hz, 60 Hz may be the first refresh rate, and 90 Hz may be the second refresh rate; and among the 120 Hz and 144 Hz, 120 Hz may be the first refresh rate, and 144 Hz may be the second refresh rate.

A target refresh rate may be selected, and then a mapping relationship between target display parameter at the gray scale binding points and data signal parameters corresponding to the gray scale binding points may be determined for the display module under the target refresh rate. The target refresh rate is between the first refresh rate and the second refresh rate, that is, the target refresh rate is greater than or equal to the first refresh rate and less than or equal to the second refresh rate. For example, the first refresh rate is 60 Hz, the second refresh rate is 90 Hz, and the target refresh rate may be selected to be 72 Hz. As another example, the first refresh rate is 120 Hz, the second refresh rate is 144 Hz, and the target refresh rate may be selected to be 120 Hz.

The mapping relationship between target display parameter at the gray scale binding points and the data signal parameters corresponding to the gray scale binding points for the display module under the target refresh rate may be taken as the target mapping relationship for the display module under the first refresh rate and the target mapping relationship for the display module under the second refresh rate. That is, the target mapping relationship for the display module under the first refresh rate includes the mapping relationship between target display parameters at the gray scale binding points and data signal parameters corresponding to the gray scale binding points under the target refresh rate. The target mapping relationship for the display module under the second refresh rate includes the mapping relationship between target display parameters at the gray scale binding points and data signal parameters corresponding to the gray scale binding points under the target refresh rate. The target mapping relationship under the first refresh rate and the target mapping relationship under the second refresh rate are the same target mapping relationship.

For example, Table 3 below shows mapping relationships between multiple target brightness and data signal parameters for the display module under four screen refresh rates.

TABLE 3

| Target brightness | 2.2 | 5.9 | 10.1 | 20.0 | 50.1 | 120.0 | 300.1 | 450.0 | 700 |
|---|---|---|---|---|---|---|---|---|---|
| 60 Hz and 90 Hz | Gamma 02 | Gamma 03 | Gamma 04 | Gamma 05 | Gamma 06 | Gamma 07 | Gamma 08 | Gamma 09 | Gamma 10 |
| 120 Hz and 144 Hz | Gamma 22 | Gamma 23 | Gamma 24 | Gamma 25 | Gamma 26 | Gamma 27 | Gamma 28 | Gamma 29 | Gamma 30 |

As shown in Table 3, Gamma02, Gamma03 . . . Gamma30 are specific data signal parameters. Herein, the display module shares a same mapping relationship for 60 Hz and under 90 Hz, so the copying process is no longer required, and the copying time is saved; and the display module shares a same mapping relationship for 120 Hz and under 144 Hz, so the copying process is no longer required, and the copying time is also saved. For example, if the time required for copying for a screen refresh rate is 19 seconds, the time of 38 seconds required for copying for two screen refresh rates may be saved.

In some cases, the display module may have a first display region and a second display region. Since the first display region and the second display region have different structures, target mapping relationships corresponding to the respective first display region and the second display region may be established, that is, the target mapping relationship may include a target mapping relationship corresponding to the first display region and a target mapping relationship corresponding to the second display region.

For example, Table 4 below shows mapping relationships between target brightness and data signal parameters for the first display region AA1 and the second display region AA2 of the display module under four screen refresh rates.

TABLE 4

| Target brightness | 2.2 | 5.9 | 10.1 | 20.0 | 50.1 | 120.0 | 300.1 | 450.0 | 700 |
|---|---|---|---|---|---|---|---|---|---|
| AA1: 60 Hz and 90 Hz | Gamma 02 | Gamma 03 | Gamma 04 | Gamma 05 | Gamma 06 | Gamma 07 | Gamma 08 | Gamma 09 | Gamma 10 |
| AA1: 120 Hz and 144 Hz | Gamma 22 | Gamma 23 | Gamma 24 | Gamma 25 | Gamma 26 | Gamma 27 | Gamma 28 | Gamma 29 | Gamma 30 |
| AA2: 60 Hz and 90 Hz | Gamma 42 | Gamma 43 | Gamma 44 | Gamma 45 | Gamma 46 | Gamma 47 | Gamma 48 | Gamma 49 | Gamma 50 |
| AA2: 120 Hz and 144 Hz | Gamma 62 | Gamma 63 | Gamma 64 | Gamma 65 | Gamma 66 | Gamma 67 | Gamma 68 | Gamma 69 | Gamma 70 |

Herein, Gamma02, Gamma03 . . . Gamma70 are specific data signal parameters. Herein, the first display region AA1 shares a same mapping relationship for 60 Hz and under 90 Hz, so the copying process is no longer required, and the copying time is saved; the second display region AA2 shares a same mapping relationship for 60 Hz and under 90 Hz, so the copying process is no longer required, and the copying time is also saved; the first display region AA1 shares a same mapping relationships for 120 Hz and under 144 Hz, so the copying process is no longer required, and the copying time is saved; and the second display region AA2 shares a same mapping relationship for 120 Hz and under 144 Hz, so the copying process is no longer required, and the copying time is saved. For example, if the time required for copying for a screen refresh rate is 19 seconds, and the time of 76 seconds required for copying for four screen refresh rates in total can be saved for the first display region and the second display region.

Since a same target mapping relationship is shared for the first refresh rate and the second refresh rate, the time required for the Gamma debugging on the display module and in turn the production takt time for the display module can be further shortened.

In step S209, the target mapping relationship is burned into the display module.

Figure 6:
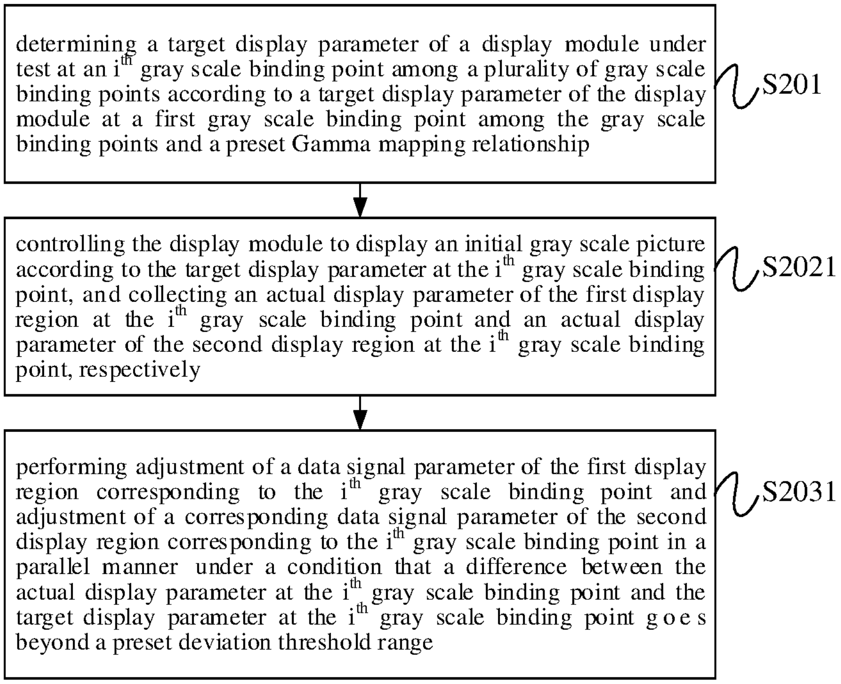
FIG. 6 is a flowchart of yet another example of a Gamma debugging method according to an embodiment of the present application.

In some embodiments, the display module has a first display region and a second display region. The Gamma debugging may be performed on the first display region and the second display region in a parallel manner. FIG. 6 is a flowchart of yet another example of a Gamma debugging method according to an embodiment of the present application. FIG. 6 differs from FIG. 3 in that step S202 in FIG. 3 may be specifically detailed as step S2021 in FIG. 6, and step S203 in FIG. 3 may be specifically detailed as step S2031 in FIG. 6.

In step S2021, the display module is controlled to display an initial gray scale picture according to the target display parameter at the $i^{th}$ gray scale binding point, and an actual display parameter of the first display region at the $i^{th}$ gray scale binding point and an actual display parameter of the second display region at the $i^{th}$ gray scale binding point are collected, respectively.

Specifically, the actual display parameter of the first display region at the $i^{th}$ gray scale binding point and the actual display parameter of the second display region at the $i^{th}$ gray scale binding point may be collected by two probes of the optical collection device, which is not limited herein.

In step S2031, adjustment of a data signal parameter of the first display region corresponding to the $i^{th}$ gray scale binding point and adjustment of a data signal parameter of the second display region corresponding to the $i^{th}$ gray scale binding point are performed in a parallel manner under a condition that the difference between the actual display parameter at the $i^{th}$ gray scale binding point and the target display parameter at the $i^{th}$ gray scale binding point goes beyond the preset deviation threshold range.

The adjustment of the data signal parameter of the first display region corresponding to the $i^{th}$ gray scale binding point and the adjustment of the data signal parameter of the second display region corresponding to the $i^{th}$ gray scale binding point may be performed by different registers in a parallel manner. For example, the adjustment of data signal parameter of the first display region may be performed by a Page50 register and the adjustment of data signal parameter of the second display region may be performed by a Page52 register. The adjustment of the data signal parameter of the first display region and the adjustment of the data signal parameter of the second display region are performed in a parallel manner so as to shorten the time required for the Gamma debugging on the display module having the first display region and the second display region, thereby shortening the production takt time for the display module having the first display region and the second display region.

In some examples, the target display parameter of the first display region corresponding to the $i^{th}$ gray scale binding point is determined according to the target display parameter of the second display region corresponding to the $i^{th}$ gray scale binding point and a preset conversion relationship. For example, the target display parameter of the second display region at a gray scale of 51DBV may be taken as a reference for determining the target display parameter of the first display region at the gray scale. The preset conversion relationship is set in advance, and is not limited herein. The determination of the target display parameter of the first display region at the $i^{th}$ gray scale binding point by using the target display parameter of the second display region at the $i^{th}$ gray scale binding point enables a seamless transition of the adjustment of the target display parameter of the first display region and the target display parameter of the second display region, to ensure that the first display region and the second display region have highly consistent optical specifications, thereby improving the display effects of the display module.

Figure 7:
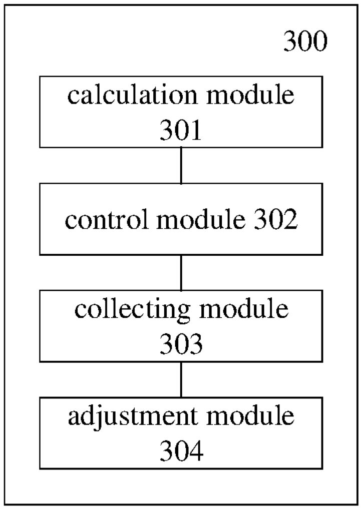
FIG. 7 is a schematic structural view of an example of a Gamma debugging apparatus according to an embodiment of the present application.

The present application further provides a Gamma debugging device, and as shown in FIG. 7. The Gamma debugging device 300 may include a calculation module 301, a control module 302, a collecting module 303 and an adjustment module 304.

The calculation module 301 is configured to determine a target display parameter of a display module under test at an $i^{th}$ gray scale binding point among a plurality of gray scale binding points according to a target display parameter of the display module at a first gray scale binding point among the gray scale binding points and a preset Gamma mapping relationship, wherein the i is an integer greater than 1, and the Gamma mapping relationship includes a mapping relationship between gray scales and target display parameters.

The control module 302 is configured to control the display module to display an initial gray scale picture according to the target display parameter at the $i^{th}$ gray scale binding point, wherein a gray scale of the initial gray scale picture is the same as a gray scale corresponding to the first gray scale binding point.

The collecting module 303 is configured to collect an actual display parameter of the display module at the $i^{th}$ gray scale binding point when the display module is displaying the initial gray scale picture according to the target display parameter at the $i^{th}$ gray scale binding point.

The adjustment module 304 is configured to adjust, under a condition that a difference between the actual display parameter at the $i^{th}$ gray scale binding point and the target display parameter at the $i^{th}$ gray scale binding point goes beyond a preset deviation threshold range, a data signal parameter corresponding to the $i^{th}$ gray scale binding point such that the difference between the actual display parameter at the $i^{th}$ gray scale binding point and the target display parameter at the $i^{th}$ gray scale binding point is within the preset deviation threshold range, wherein the data signal parameter is configured to control a voltage of a data signal.

In some examples, the data signal parameter may include a Gamma register value, which is associated with the voltage of the data signal.

In some examples, the target display parameter includes target brightness, and the actual display parameter includes actual brightness. In some other examples, the target display parameter further includes a target color coordinate, and the actual display parameter further includes an actual color coordinate.

In the embodiments of the present application, the display module is controlled to display, according to a target display parameter at a certain gray scale binding point, a gray scale picture having a gray scale consistent with a gray scale of the first gray scale binding point. By comparing the collected actual display parameter to the target display parameter, the data signal parameter for controlling the voltage of the data signal is adjusted such that the actual display parameter at the certain gray scale binding point is approximate to the target display parameter, that is, a difference between the actual display parameter and the target display parameter is within the preset deviation threshold range, thereby implementing the Gamma debugging. In a process of the Gamma debugging, a same gray scale picture with the gray scale is used for the respective gray scale binding points, so it is not required to input and switch gray scale pictures with different gray scales, and thus time for inputting and switching the gray scale pictures is saved, and time required for the Gamma debugging is shortened, thereby improving the efficiency of the Gamma debugging. Accordingly, the production takt time for the display module is also shortened. The production takt time for the display module may be halved by using the Gamma debugging scheme in the embodiments of the present application. Especially, under a condition that the display module supports multiple screen refresh rates, the time for performing the Gamma debugging for the multiple screen refresh rates is significantly shortened.

In some embodiments, the control module 302 may further be configured to control the display module to display the received initial gray scale picture.

The calculation module 301 may further be configured to determine the target display parameter at the first gray scale binding point according to the initial gray scale picture displayed by the display module.

The collecting module 303 may further be configured to collect an actual display parameter at the first gray scale binding point.

The adjustment module 304 may further be configured to adjust, under a condition that a difference between the actual display parameter at the first gray scale binding point and the target display parameter at the first gray scale binding point goes beyond the preset deviation threshold range, a data signal voltage corresponding to the first gray scale binding point such that the difference between the actual display parameter at the first gray scale binding point and the target display parameter at the first gray scale binding point is within the preset deviation threshold range.

Figure 8:
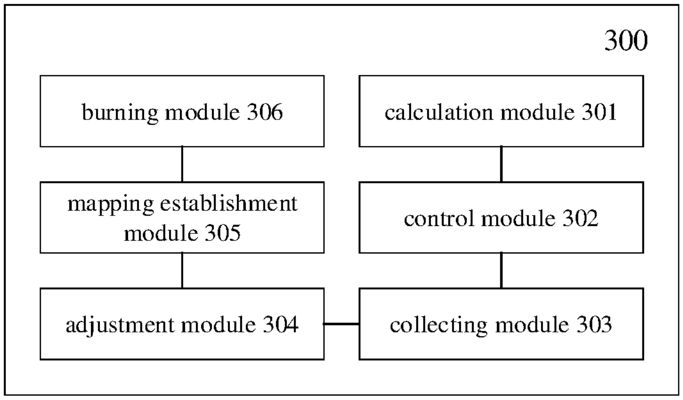
FIG. 8 is a schematic structural view of another example of a Gamma debugging apparatus according to an embodiment of the present application.

FIG. 8 is a schematic structural view of another example of a Gamma debugging apparatus according to an embodiment of the present application. FIG. 8 differs from FIG. 7 in that the Gamma debugging apparatus shown in FIG. 8 may further include a mapping establishment module 305 and a burning module 306.

The mapping establishment module 305 is configured to establish a target mapping relationship between target display parameters and data signal parameters for the display module according to target display parameters at the gray scale binding points and data signal parameters corresponding to the respective gray scale binding points.

The burning module 306 is configured to burn the target mapping relationship into the display module.

In some examples, screen refresh rates supported by the display module may include a first refresh rate and a second refresh rate. The target mapping relationship for the display module under the first refresh rate includes a mapping relationship between target display parameters at the gray scale binding points and data signal parameters corresponding to the respective gray scale binding point under a target refresh rate, and the target mapping relationship for the display module under the second refresh rate includes a mapping relationship between target display parameters at the gray scale binding points and data signal parameters corresponding to the respective gray scale binding points under the target refresh rate, wherein the target refresh rate is greater than or equal to the first refresh rate and less than or equal to the second refresh rate.

In some embodiments, the display module may have a first display region and a second display region.

The collecting module 303 may be configured to collect an actual display parameter of the first display region at the $i^{th}$ gray scale binding point and an actual display parameter of the second display region at the $i^{th}$ gray scale binding point, respectively.

The adjustment module 304 may be configured to perform adjustment of a data signal parameter of the first display region corresponding to the $i^{th}$ gray scale binding point and adjustment of a data signal parameter of the second display region corresponding to the $i^{th}$ gray scale binding point in a parallel manner.

In some examples, a target display parameter of the first display region corresponding to the $i^{th}$ gray scale binding point may be determined according to a target display parameter of the second display region corresponding to the $i^{th}$ gray scale binding point and a preset conversion relationship.

Figure 9:
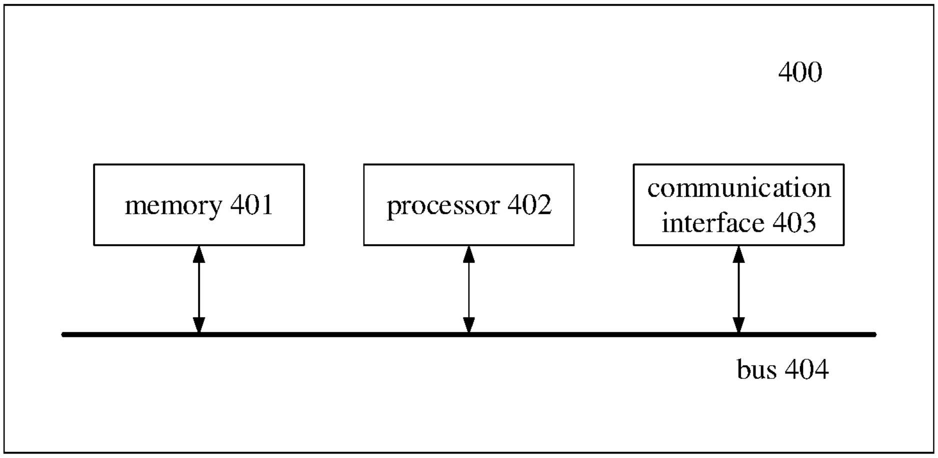
FIG. 9 is a schematic structural view of an example of a Gamma debugging device according to an embodiment of the present application.

The present application further provides a Gamma debugging device. FIG. 9 is a schematic structural view of an example of a Gamma debugging device according to an embodiment of the present application. As shown in FIG. 9, The Gamma debugging device 400 includes a memory 401 and a processor 402, wherein a computer program is stored on the memory 401 and executable by the processor 402.

In one example, the processor 402 may include a central processing unit (CPU), or an Application Specific Integrated Circuit (ASIC), or may be configured to implement one or more integrated circuits of the embodiments of the present application.

The memory 401 may include a Read-Only Memory (ROM), a Random Access Memory (RAM), a magnetic disk storage medium device, an optical storage medium device, a flash memory device, an electrical, optical, or other physical/tangible memory storage device. Thus, in general, the memory includes one or more tangible (non-transitory) computer-readable storage medium (for example, memory device) encoded with software including computer-executable instructions, and the software, when executed (for example, by one or more processors), is operable to perform operations described with reference to the Gamma debugging method according to the present application.

The processor 402 executes, by reading out an executable program code stored in the memory 401, a computer program corresponding to the executable program code to implement the Gamma debugging method according to the above embodiments.

In one example, the Gamma debugging device 400 may further include a communication interface 403 and a bus 404. As shown in FIG. 9, the memory 401, the processor 402 and the communication interface 403 are connected via the bus 404 and communicate with each other.

The communication interface 403 is mainly used for implementing communication between various modules, devices, units and/or devices in the embodiments of the present application. An input device and/or an output device may be further attached through communication interface 403.

The bus 404 includes hardware, software or both of the hardware and the software, and is used for coupling components of the Gamma debugging device 400 with each other. As an example but not limitation, the bus 404 may include an Accelerated Graphics Port (AGP) or another other graphics bus, an Enhanced Industry Standard Architecture (EISA) bus, a Front Side Bus (FSB), a Hyper Transport (HT) interconnect, an Industry Standard Architecture (ISA) bus, an infinite bandwidth interconnect, a Low pin count (LPC) bus, a memory bus, a Micro Channel Architecture (MCA) bus, a Peripheral Component Interconnect (PCI) bus, a PCI-Express (PCI-E) bus, a Serial Advanced Technology Attachment (SATA) bus, a Video Electronics Standards Association Local Bus (VLB) bus, or any other suitable bus, or a combination of two or more of the above. The bus 404 may include one or more buses, as appropriate. Although the embodiments of the present application describe and show a particular bus, the present application contemplates any suitable bus or interconnect.

The embodiments of the present application further provide a computer-readable storage medium having stored thereon computer program instructions, wherein the computer program instructions, when executed by a processor, implement the Gamma debugging method in the above embodiments and the same technical effect can be reached, which is not repeated here in order to avoid repetition. The computer-readable storage medium may include a non-transitory computer-readable storage medium such as a Read-Only Memory (ROM), a Random Access Memory (RAM), a magnetic disk or an optical disk, and the like, which is not limited herein.

The aspects of the present application are described above with reference to the flowcharts and/or the block diagrams of the method, apparatus (systems) and computer program products according to the embodiments of the present application. It is understood that each block of the flowcharts and/or block diagrams and combinations of the blocks of the flowcharts and/or the block diagrams may be implemented by computer program instructions. These computer program instructions may be provided to a processor of a general purpose computer, a special purpose computer, or other programmable data processing apparatus to produce a machine, so that the instructions executed by the processor of the computer or other programmable data processing apparatus can implement functions/acts specified in one or more blocks of the flowcharts and/or block diagrams. Such processor may be, but is not limited to, a general purpose processor, a special purpose processor, an application specific processor, or a field programmable logic circuit. It is also understood that each block of the block diagrams and/or flowcharts and combinations of blocks of the block diagrams and/or flowcharts may further be implemented by special purpose hardware performing specified functions or acts, or may be implemented by combinations of special purpose hardware and computer instructions.

What is claimed is:

1. A method comprising:

a) controlling a display module under test to display an initial gray scale picture at a first gray scale binding point;

b) determining a target display parameter at the first gray scale binding point according to the initial gray scale picture displayed by the display module;

c) collecting an actual display parameter at the first gray scale binding point;

d) adjusting, under a condition that a difference between the actual display parameter at the first gray scale binding point and the target display parameter at the first gray scale binding point goes beyond a preset deviation threshold range, a data signal parameter corresponding to the first gray scale binding point such that the difference between the actual display parameter at the first gray scale binding point and the target display parameter at the first gray scale binding point is within the preset deviation threshold range, wherein the data signal parameter is configured to control a voltage of the data signal;

e) determining the target display parameter at an $i^{th}$ gray scale binding point among a plurality of gray scale binding points according to the target display parameter at the first gray scale binding point among the plurality of gray scale binding points and a preset Gamma mapping relationship, wherein the display module has a first display region and a second display region, i is an integer greater than 1, and the Gamma mapping relationship comprises a mapping relationship between gray scales and target display parameter;

f) controlling the display module to display the initial gray scale picture according to the target display parameter at the $i^{th}$ gray scale binding point;

g) collecting an actual display parameter of the display module at the $i^{th}$ gray scale binding point, wherein the gray scale of the initial gray scale picture is consistent with the gray scale corresponding to the first gray scale binding point;

h) adjusting, under a condition that a difference between the actual display parameter at the $i^{th}$ gray scale binding point and the target display parameter at the $i^{th}$ gray scale binding point goes beyond a preset deviation threshold range, a data signal parameter of the first and second display regions corresponding to the $i^{th}$ gray scale binding point in a parallel manner using a preset conversion relationship such that the difference between the actual display parameter at the $i^{th}$ grayscale binding point and the target display parameter at the $i^{th}$ gray scale binding point is within the preset deviation threshold range;

i) repeating steps e) to h) for determining target display parameter at a plurality of gray scale binding points and for adjusting data signal parameter of the first and second display regions corresponding to a respective one of the plurality of gray scale binding points;

j) establishing a target mapping relationship between target display parameter and data signal parameter for the display module according to target display parameter at the plurality of gray scale binding points and data signal parameter after adjusting and corresponding to the respective one of the gray scale binding points; and k) burning the target mapping relationship into the display module.

2. The method according to claim 1, wherein screen refresh rates supported by the display module comprise a first refresh rate and a second refresh rate; the target mapping relationship for the display module under the first refresh rate comprises a mapping relationship between target display parameter at the plurality of gray scale binding points and data signal parameter corresponding to the respective gray scale binding point under a target refresh rate; and the target mapping relationship for the display module under the second refresh rate comprises a mapping relationship between target display parameter at the plurality of gray scale binding points and data signal parameter corresponding to the respective gray scale binding points under the target refresh rate; wherein the target refresh rate is greater than or equal to the first refresh rate and less than or equal to the second refresh rate.

3. The method according to claim 2, wherein a light transmittance of the first display region is greater than a light transmittance of the second display region, and the target mapping relationship comprises a target mapping relationship corresponding to the first display region and a target mapping relationship corresponding to the second display region.

4. The method according to claim 2, wherein the data signal parameter comprises a Gamma register value, which is associated with the voltage of the data signal.

5. The method according to claim 1, wherein adjustment of the data signal parameter of the first display region corresponding to the $i^{th}$ gray scale binding point and adjustment of the data signal parameter of the second display region corresponding to the $i^{th}$ gray scale binding point are performed by different registers in the parallel manner, and wherein the collection of the actual display parameter at the $i^{th}$ gray scale binding point comprises:

collecting an actual display parameter of the first display region at the $i^{th}$ gray scale binding point and an actual display parameter of the second display region at the $i^{th}$ gray scale binding point, respectively.

6. The method according to claim 5, wherein a target display parameter of the first display region corresponding to the $i^{th}$ gray scale binding point is determined according to a target display parameter of the second display region corresponding to the $i^{th}$ gray scale binding point and the preset conversion relationship.

7. The method according to claim 6, wherein the data signal parameter comprises a Gamma register value, which is associated with the voltage of the data signal.

8. The method according to claim 5, wherein the data signal parameter comprises a Gamma register value, which is associated with the voltage of the data signal.

9. The method according to claim 1, wherein the data signal parameter comprises a Gamma register value, which is associated with the voltage of the data signal.

10. The method according to claim 9, wherein the Gamma register value comprises sub-pixel register values of a pixel unit in the display module.

11. The method according to claim 1, wherein a light transmittance of the first display region is greater than a light transmittance of the second display region, and the target mapping relationship comprises a target mapping relationship corresponding to the first display region and a target mapping relationship corresponding to the second display region.

12. The method according to 1, wherein the target display parameter comprises target brightness, and the actual display parameter comprises actual brightness.

13. The method according to claim 12, wherein the target display parameter further comprises a target color coordinate, and the actual display parameter further comprises an actual color coordinate.

14. A non-transitory computer readable storage medium, comprising instructions, which when executed by a processor, cause the processor to perform the method according to claim 1.

* * * * *